United States Patent
Christensen

Patent Number: 6,147,343
Date of Patent: Nov. 14, 2000

[54] PHOTOELECTRIC IMAGING METHOD AND APPARATUS

[75] Inventor: Michael L. Christensen, Windsor, Colo.

[73] Assignee: Hewlett-Packard Company, Palo Alto, Calif.

[21] Appl. No.: 09/121,793

[22] Filed: Jul. 23, 1998

[51] Int. Cl.$^7$ .......................................... H01J 3/14
[52] U.S. Cl. ............................. 250/234; 358/497
[58] Field of Search .................................. 250/234, 235, 250/236, 208.1, 239; 358/474, 483, 496, 497; 235/462, 472; 359/637

[56] References Cited

U.S. PATENT DOCUMENTS

| | | | |
|---|---|---|---|
| 4,709,144 | 11/1987 | Vincent | 250/226 |
| 4,806,750 | 2/1989 | Vincent | 250/226 |
| 4,870,268 | 9/1989 | Vincent et al. | 250/226 |
| 4,926,041 | 5/1990 | Boyd | 250/226 |
| 5,018,808 | 5/1991 | Meyers et al. | 250/235 |
| 5,019,703 | 5/1991 | Boyd et al. | 250/208.1 |
| 5,032,004 | 7/1991 | Steinle | 359/637 |
| 5,040,872 | 8/1991 | Steinle | 359/638 |
| 5,044,727 | 9/1991 | Steinle | 359/637 |
| 5,151,887 | 9/1992 | Miyazaki | 369/44.32 |
| 5,227,620 | 7/1993 | Elder, Jr. et al. | 250/208.1 |
| 5,241,174 | 8/1993 | Ando | 250/235 |
| 5,306,908 | 4/1994 | McConica et al. | 250/234 |
| 5,315,111 | 5/1994 | Burns et al. | 250/235 |
| 5,373,437 | 12/1994 | Itoh et al. | 364/44.32 |
| 5,381,020 | 1/1995 | Kochis et al. | 250/566 |
| 5,387,789 | 2/1995 | Ota | 250/201.7 |
| 5,410,347 | 4/1995 | Steinle et al. | 348/270 |
| 5,646,394 | 7/1997 | Steinle et al. | 250/208.1 |
| 5,723,859 | 3/1998 | Kerschner et al. | 250/234 |
| 5,753,908 | 5/1998 | Christensen | 250/208.1 |
| 5,777,321 | 7/1998 | Kerschner et al. | 250/235 |

*Primary Examiner*—Seungsook Ham
*Assistant Examiner*—Kevin Pyo

[57] ABSTRACT

Disclosed herein is a method and apparatus for compensating for temperature-induced scan line drift in a photoelectric imaging apparatus. A scan line drift compensation mechanism may be placed in contact with at least one of the optical components, e.g., a mirror, contained within the optical system of a photoelectric imaging apparatus. The scan line drift compensation mechanism may be formed from two members, each having a different coefficient of thermal expansion. In this manner, the scan line drift compensation mechanism is able to exert a force on the optical component in response to a change in temperature.

21 Claims, 8 Drawing Sheets

PHOTOELECTRIC IMAGING METHOD AND APPARATUS

FIELD OF THE INVENTION

The present invention relates generally to photoelectric imaging devices and, more specifically, to a method and apparatus for compensating for temperature induced scan line drift in photoelectric imaging devices.

BACKGROUND OF THE INVENTION

Photoelectric imaging devices are well-known in the art and produce machine-readable data which is representative of an image of an object, e.g. a page of printed text. Examples of such photoelectric imaging devices include telefax machines, photocopy machines and optical scanning devices.

Many photoelectric imaging devices employ line-focus systems which image an object by sequentially focusing narrow "scan line" portions of the object onto a linear photosensor array by causing relative movement between a scanning head and the object being scanned.

In a line-focus system, a light beam from an illuminated line object is imaged by a lens onto a linear photosensor array which is positioned remotely from the line object. The linear photosensor array is a single dimension array of photoelements which correspond to small area locations on the line object. These small area locations on the line object are commonly referred as "picture elements" or "pixels." In response to light from its corresponding pixel location on the line object, each photosensor pixel element in the linear photosensor array (sometimes referred to simply as a "pixel") produces a data signal which is representative of the light intensity that it experiences during an immediately preceding interval of time known as a sampling interval. All of the photoelement data signals are received and processed by an appropriate data processing system.

In a color line focus system, a number of photosensor arrays may be used to acquire a corresponding number of distinct color components. Each photosensor array may be used to acquire a separate color component (typically red, green and blue components). Many color line focus systems use a plurality of photosensors, each of which has a different color filter associated therewith. In this manner, each photosensor is able to acquire color data corresponding to a single color component (e.g., red, green and blue).

Other color line focus systems employ beam splitter devices for spectrally separating an imaging light beam into color component beams. These separate color component beams are projected onto separate linear photosensor arrays. Still other color line focus systems project color component images onto a single linear array in a series of separate scanning passes.

The construction and operation of color line focus systems employing beam splitter assemblies and photosensor arrays are disclosed in the following U.S. Pat. No. 5,410,347 of Steinle et al. for COLOR OPTICAL SCANNER WITH IMAGE REGISTRATION HOLDING ASSEMBLY; U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER (and corresponding EPO patent application no. 90306876.5 filed Jun. 22, 1990); U.S. Pat. No. 5,019,703 of Boyd et al. for OPTICAL SCANNER WITH MIRROR MOUNTED OCCLUDING APERTURE OR FILTER (and corresponding EPO patent application no. 90312893.2 filed Nov. 27, 1990); U.S. Pat. No. 5,032,004 of Steinle for BEAM SPLITTER APPARATUS WITH ADJUSTABLE IMAGE FOCUS AND REGISTRATION (and corresponding EPO patent application no. 91304185.1 filed May 9, 1991); U.S. Pat. No. 5,044,727 of Steinle for BEAM SPLITTER/COMBINER APPARATUS (and corresponding EPO patent application no. 91303860.3 filed Apr. 29 1991); U.S. Pat. No. 5,040,872 of Steinle for BEAM SPLITTER/COMBINER WITH PATH LENGTH COMPENSATOR (and corresponding EPO patent application no. 90124279.2 filed Dec. 14, 1990 which has been abandoned); U.S. Pat. No. 5,227,620 of Elder, Jr. et al. for APPARATUS FOR ASSEMBLING COMPONENTS OF COLOR OPTICAL SCANNERS (and corresponding EPO patent application no. 91304403.8 filed May 16, 1991) and U.S. Pat. No. 5,646,394 of Steinle et al. for IMAGING DEVICE WITH BEAM STEERING CAPABILITY, which are all hereby specifically incorporated by reference for all that is disclosed therein.

A hand-held line focus system is a photoelectric imaging device which is moved across a scanned object, e.g. a page of text, by hand. Optical systems for hand-held line focus systems must generally be very compact due to the relatively small size of hand-held scanning devices.

The construction and operation of hand-held line focus systems are disclosed in the following U.S. Pat. No. 5,381,020 of Kochis et al. for HAND-HELD OPTICAL SCANNER WITH ONBOARD BATTERY RECHARGING ASSEMBLY and U.S. Pat. No. 5,306,908 of McConica et al. for MANUALLY OPERATED HAND-HELD OPTICAL SCANNER WITH TACTILE SPEED CONTROL ASSEMBLY (and corresponding EPO patent application no. 94301507.3 filed Mar. 2, 1994) and in the following U.S. patent application Ser. No. 08/601,276 of Ronald K. Kerschner et al., filed Jan. 29, 1996, for HAND-HELD SCANNING DEVICE and Ser. No. 08/592,904 of Ronald K. Kerschner et al. filed Jan. 29, 1996, for SCANNING DEVICE WITH NON-CONTACT OPTICAL COMPONENTS, which are all hereby specifically incorporated by reference for all that is disclosed therein.

In a line focus system, optical components, including a lens as previously mentioned, are generally arranged between the object to be imaged and the photoelectric sensing device, e.g., a linear photosensor array. The optical components serve to direct and focus the light beam from the scan line area of the object being imaged onto the linear photosensor array.

Typically, these optical components are mounted, along with the linear photosensor array, within a housing which is moveable relative to the object being scanned. The housing, in turn, generally includes an elongated opening or slot to enable the light beam to enter the housing and impinge upon the optical components housed therewithin. In order to permit unobstructed passage of the light beam into the housing, the width of the slot must be at least as wide as the light beam at the point where it enters the housing. The width of the slot, however, must generally be formed larger still in order to accommodate any drift in the scan line which may occur during operation.

The components, e.g., the mirrors, lens and photosensor of a typical photoelectric imaging apparatus are generally attached to the housing which may, for example, be formed of a plastic material. This plastic material often has a relatively high coefficient of thermal expansion, that is, an increase in temperature causes the material to expand a relatively large amount and a decrease in temperature causes the material to contract a relatively large amount. As can be appreciated, this expansion and contraction causes relative movement between the various components, e.g., the mirrors, lens and photosensor, housed within the reciprocal housing. This relative movement, in turn, causes the light beam and, thus, the scan line to drift. As previously pointed out, the housing slot must be large enough to accommodate this scan line drift since, if the scan line drifts beyond the edge of the slot, the optical components will no longer be able to image any portion of the object onto the linear photosensor array.

A typical photoelectric imaging apparatus is designed to operate over a range of temperatures. Accordingly, the slot of a typical photoelectric imaging apparatus must be made sufficiently wide to accommodate the scan line drift encountered over this operating range of temperatures. Providing a wide slot, however, is disadvantageous for several reasons. One reason is that a wide slot allows stray light to enter the housing. This stray light, in turn, causes various optical problems such as increased sensitivity to contamination and a limited dynamic range. The use of a wide slot also limits the types of color separation methods which may be used within the housing. A trichromatic beam splitter arrangement, for example, is not practically useable in conjunction with a large slot.

Accordingly, it would be desirable to provide a photoelectric imaging device which overcomes the problems described above associated with temperature induced scan line drift.

SUMMARY OF THE INVENTION

The present invention is directed to a method and apparatus for compensating for temperature-induced scan line drift in a photoelectric imaging apparatus. A scan line drift compensation mechanism may be placed in contact with at least one of the optical components, e.g, a mirror, contained within the optical system of a photoelectric imaging apparatus. The scan line drift compensation mechanism may be formed from two members, each having a different coefficient of thermal expansion. In this manner, the scan line drift compensation mechanism is able to exert a force on the optical component in response to a change in temperature.

In the case, for example, where the optical component is a mirror, this force will cause the mirror to rotate, thus adjusting the optical path into proper alignment. The scan line drift compensation mechanism may be configured so as to counteract the amount of temperature-induced scan line drift exhibited by a particular photoelectric imaging apparatus. In this manner, the scan line drift compensation mechanism is able to compensate for temperature-induced scan line drift and, thus, maintain the optical path in substantial alignment despite changes in temperature of the photoelectric imaging apparatus operating environment. This, in turn, allows the slot in the photoelectric imaging apparatus housing to be made smaller, thus eliminating the problems previously described.

One end of the scan line drift mechanism may, as described above, be in contact with one optical component. In this case, the opposite end of the scan line drift mechanism may be rigidly attached to the housing containing the optical components of the photoelectric imaging apparatus.

As an alternative, the scan line drift mechanism may be located between two optical components such that a change in temperature will cause both of the optical components to be adjusted. In this case, the scan line drift mechanism may be rigidly attached, e.g., at its center, to the photoelectric imaging apparatus housing. Alternatively, the scan line drift mechanism may be allowed to float between the two optical components and may be retained only, for example, by a bracket.

DETAILED DESCRIPTION OF THE INVENTION

Figure 1:
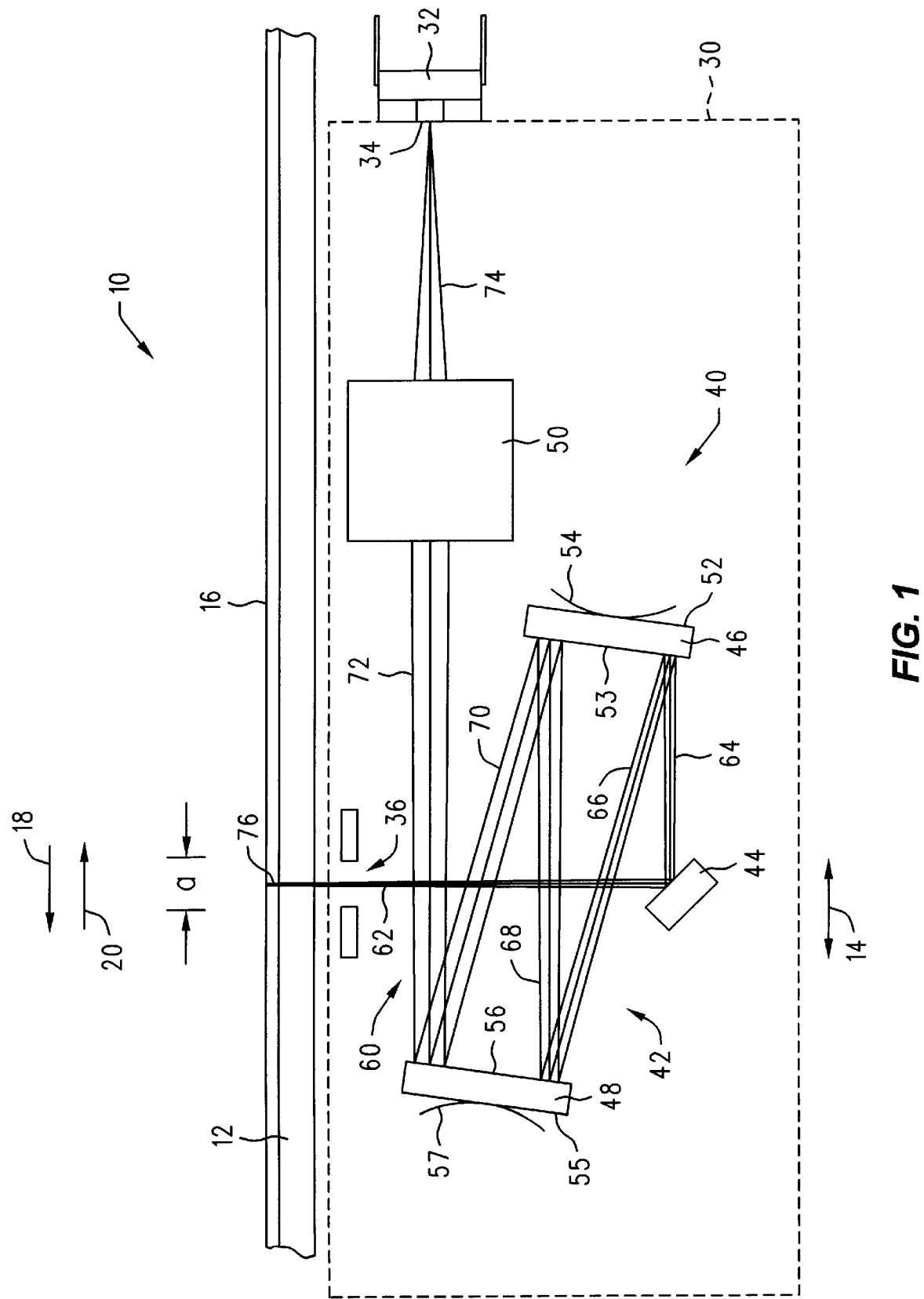
FIG. 1 is a cross-sectional view schematically illustrating a portion of a photoelectric imaging apparatus.

FIGS. 2–9 in general, illustrate a photoelectric imaging apparatus 10 for producing machine-readable data representative of an imaged object 16. The photoelectric imaging apparatus may include a photosensor assembly 32, a light path 60 extending between the object 16 and the photosensor assembly 32, an optical component 46, 48 located along the light path 60 and an optical component displacement device 100 in contact with the optical component 46, 48. The optical component displacement device 100 may include a first member 110 having a first coefficient of thermal expansion and a second member 160 having a second coefficient of thermal expansion. The first coefficient of thermal expansion is different from the second coefficient of thermal expansion.

FIGS. 2–9 also illustrate, in general, a photoelectric imaging apparatus 10 for producing machine-readable data representative of an imaged object 16. The photoelectric imaging apparatus 10 may include a photosensor assembly 32 and an optical component 46, 48 located along a light path 60 extending between the object 16 and the photosensor assembly 32. The optical component 46, 48 includes a first surface 53, 56 and an oppositely disposed second surface 52, 55. The photoelectric imaging apparatus 10 may further include a first member 110 having a first coefficient of thermal expansion, wherein the first member 110 is in contact with the first surface 53, 56 of the optical component 46, 48 and a second member 160 having a second coefficient of thermal expansion, wherein the second member 160 is in contact with the first surface 53, 56 of the optical component 46, 48. The first coefficient of thermal expansion is different from the second coefficient of thermal expansion.

FIGS. 2–9 also illustrate, in general, a method for improving the alignment of a beam of light 60 within a photoelectric imaging apparatus 10. The method may include the steps of providing a photosensor array 34 within the photoelectric imaging apparatus 10, providing an imaging subassembly 40 within the photoelectric imaging apparatus 10, providing an optical component 46, 48 within the imaging subassembly 40, providing an optical component displacement device 100 in contact with the optical component 46, 48, directing the beam of light 60 with the imaging subassembly 40 from a portion of an object 16 to be imaged by the photoelectric imaging apparatus 10 to the photosensor array 34 and improving the alignment of the beam of light 60 with the photosensor array 34 by applying force to the optical component 46, 48 with the optical component displacement device 100 in response to a change in temperature.

Having thus described the apparatus and method in general, they will now be described in further detail.

FIG. 1 schematically illustrates a photoelectric imaging apparatus 10 which may, for example, be an optical scanning device. Photoelectric imaging apparatus 10 may include a translucent platen 12 and a reciprocal scan carriage 30 which may, for example, be of the type which is reciprocally moveable beneath the platen 12 in the directions indicated by the arrow 14 in FIG. 1. Scan carriage 30 may, for example, include a body portion 78 and a cover member 80, FIG. 6.

Referring again to FIG. 1, in operation, an object 16 to be imaged, e.g., a document, may be placed face down on the platen 12. Scan carriage 30 may include a photosensor package 32. The photosensor package 32 may include a photosensor device 34, e.g., a CCD device. The scan carriage 30 may further include an optical assembly 40 which is adapted to focus a scan line image 76 of the object 16 onto the photosensor device 34. In this manner, as the scan carriage 30 moves beneath the platen 12, successive scan line images of the object 16 may be acquired by the photosensor device 34. By combining these successive scan line images, a complete image representative of the object 16 may be acquired.

Referring again to FIG. 1, the housing optical assembly 40 may include a plurality of mirrors 42, such as the individual mirrors 44, 46 and 48, and a lens 50. The mirrors 42 serve to fold the optical path 60 into a plurality of segments in order to provide the necessary optical path length in a relatively compact configuration. Specifically, the optical path 60 is folded into a first segment 62 located between the scan line 76 and the mirror 44, a second segment 64 located between the mirror 44 and the mirror 46, a third segment 66 located between the mirror 46 and the mirror 48, a fourth segment 68 located between the mirror 48 and the mirror 46, a fifth segment 70 located between the mirror 46 and the mirror 48 and a sixth segment 72 located between the mirror 48 and the lens 50. A seventh segment 74 of the optical path 60 extends between the lens 50 and the photosensor 34 as shown.

It is noted that the optical assembly 40 illustrated in FIG. 1, is a "double bounce" optical assembly in that the optical path 60 is reflected by each of the mirrors 46 and 48 twice. Such a double bounce system enhances the compactness of the optical path 60 and, thus, the overall configuration of the scan carriage 30.

The scan carriage 30 may also include a slot, schematically illustrated in FIG. 1 by the numeral 36. Slot 36 is an elongated opening in the upper wall of the scan carriage 30 which allows the optical path 60 to enter the housing. In order to permit unobstructed passage of the optical path 60 into the scan carriage 30, the width "a" of the slot 36 must be at least as wide as the optical path 60 at the point where it enters the housing. The width "a", however, must generally be formed larger still in order to accommodate any drift in the scan line which may occur during operation, as will be described in further detail herein.

In a typical optical scanning device, the optical assembly 40 and photosensor package 32 will be adjusted so that the scan line 76 will generally be centered within the slot 36 at a nominal operating temperature, e.g., 22 degrees, Celsius. The slot 36 must, however, be made wide enough to accommodate scan line drift induced by temperature variations which are encountered across the specified operating temperature range for the photoelectric imaging apparatus 10.

As shown in FIG. 1, the components, e.g., the mirrors 42, lens 50 and photosensor package 32 are attached to the reciprocal scan carriage 30. With respect to the mirror 46, for example, the front surface 53 of the mirror 46 may be positioned against a first portion of the housing, not shown. A spring 54 may be located between a second portion 86, FIG. 5, of the scan carriage 30, and the rear surface 52 of the mirror 46, thus biasing the mirror 46 toward the first portion of the housing and holding the front surface 53 of the mirror 46 securely against the first portion of the housing.

With respect to the mirror 48, for example, the front surface 56 of the mirror 48 may be positioned against a third portion of the housing, not shown. A spring 57 may be located between a fourth portion 88, FIG. 5, of the scan carriage 30, and the rear surface 55 of the mirror 48, thus biasing the mirror 48 toward the third portion of the housing and holding the front surface 56 of the mirror 46 securely against the third portion of the housing.

The contact described above, between the front surface 53 of the mirror 46 and the first portion of the housing and between the front surface 56 of the mirror 48 and the third portion of the housing, serves to index the mirrors 46 and 48 in specific locations relative to the remainder of the housing and relative to each other.

The scan carriage 30 may, for example, be formed of a plastic material. This plastic material often has a relatively high coefficient of thermal expansion, that is, an increase in temperature causes the material to expand a relatively large amount and a decrease in temperature causes the material to contract a relatively large amount. As can be appreciated, this expansion and contraction may cause relative movement between the mirrors 46 and 48, which are indexed to the housing as described above, and between the other components (e.g., the mirror 44, lens 50, photosensor package 32 and slot 36) located within the reciprocal housing 30. This relative movement, in turn, causes the scan line 76 to drift in the directions indicated by the arrows 18 and 20 in FIG. 1. Specifically, for example, an increase in temperature may cause the scan line 76 to drift in the direction 18 while a decrease in temperature may cause the scan line to drift in the direction 20. As previously pointed out, the slot 36 must be large enough to accommodate this scan line drift since, if the scan line drifts beyond the edge of the slot, the optical assembly 40 will no longer be able to image any portion of the object 16 onto the photosensor device 34.

It is noted that the term "scan line" as used herein, refers to the line on the object 16 which is imaged on the photosensor device 34 by the optical assembly 40. If, for example, the photosensor device 34, due to a temperature change, moves up or down (as viewed in FIG. 1) relative to the optical assembly 40, it can be appreciated that the location of the scan line 76 will shift accordingly.

A typical photoelectric imaging apparatus is designed to operate over a range of temperatures. Accordingly, the slot of a typical photoelectric imaging apparatus must be made sufficiently wide to accommodate the scan line drift encountered over this operating range of temperatures. It has been found that the scan line 76 may exhibit a total drift, for example, of about 0.95 mm over a temperature range of from about 5 degrees Celsius to about 40 degrees Celsius.

Providing a wide slot, however, is disadvantageous for several reasons. A wide slot allows stray light to enter the scan carriage 30. This stray light, in turn, causes various optical problems such as increased sensitivity to contamination and a limited dynamic range. The use of a wide slot also limits the types of color separation methods which may be used within the housing. A trichromatic beam splitter arrangement, for example, is not practically useable in conjunction with a large slot.

For the reasons set forth above, it is desirable to eliminate or reduce the amount of temperature induced scan line drift and, thus, allow a reduction in the width of the slot in a photoelectric imaging apparatus.

Figure 2:
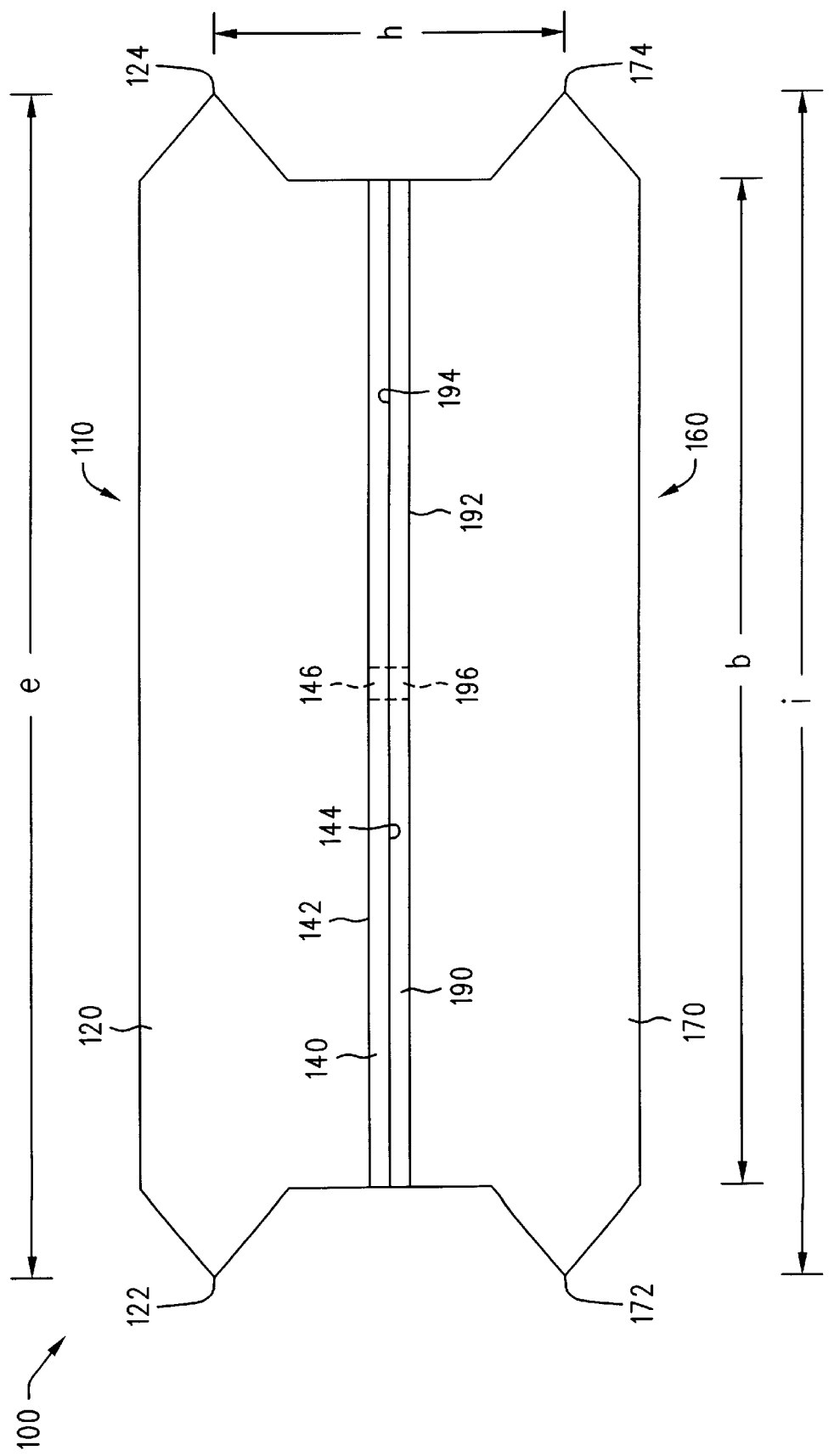
FIG. 2 is a front elevation view of a scan line drift compensation mechanism useable in conjunction with the photoelectric imaging apparatus of FIG. 1.
Figure 3:
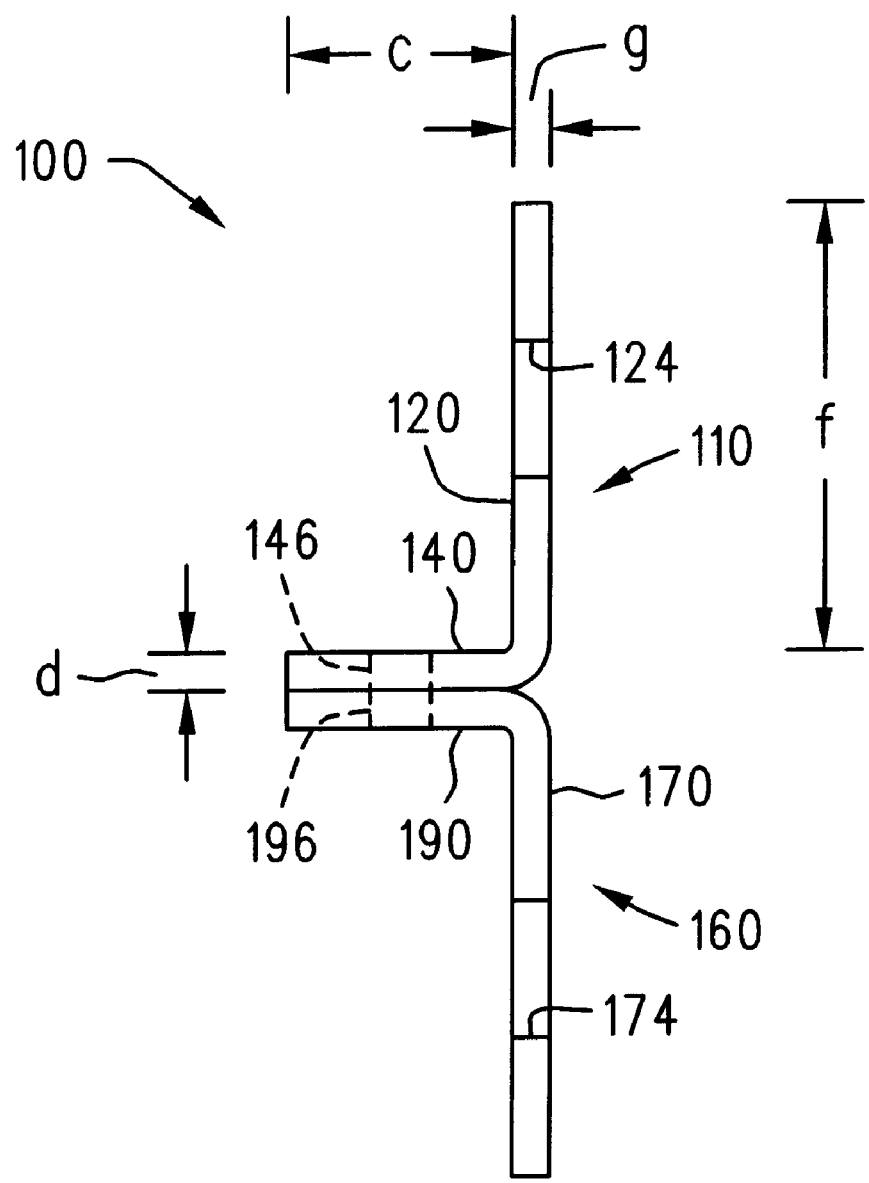
FIG. 3 is a side elevation view of the scan line drift compensation mechanism of FIG. 2, viewed from the right side thereof.

FIGS. 2 and 3 illustrate a scan line drift compensation mechanism 100 which compensates for temperature induced scan line drift in a manner as will be described in further detail herein.

Referring to FIGS. 2 and 3, compensation mechanism 100 may include first and second members 110, 160. Compensation mechanism first member 110 may be substantially "L" shaped, with a plate portion 120 forming the longer leg of the "L" and a flange portion 140 forming the shorter leg of the "L" as shown. First member flange portion 140 may have a first surface 142 and a second surface 144 disposed opposite the first surface 142. A hole 146 may extend through the flange portion 140 between the surfaces 142, 144, as shown in FIGS. 2 and 3. The hole 146 may, for example, be circular, having a diameter of about 0.125 inches. First member flange portion 140 may have a length "b", FIG. 2, a width "c", FIG. 3, and a thickness "d".

First member plate portion 120 may be integrally formed with the first member flange portion 140 and may, for example, be arranged at substantially a right angle with respect to the first member flange portion 140. Plate portion 120 may include first and second contact protrusions 122, 124 as shown, for example, in FIG. 2. The contact protrusions 122, 124 may be spaced a distance "e" as shown in FIG. 2. First member plate portion 120 may have a height "f" and a thickness "g", FIG. 3, which may be the same dimension as the first member flange portion 140 previously described.

Compensation mechanism second member 160 may have a substantially similar configuration to that of the compensation mechanism first member 100, described above. Specifically, compensation mechanism second member 160 may be substantially "L" shaped, with a plate portion 170 forming the longer leg of the "L" and a flange portion 190 forming the shorter leg of the "L" as shown in FIGS. 2 and 3. First member flange portion 190 may have a first surface 192 and a second surface 194 disposed opposite the first surface 192. A hole 196 may extend through the flange portion 190 between the surfaces 192, 194, as shown. The hole 196 may, for example, be circular, having a diameter of about 0.125 inches. Second member flange portion 190 may have a length equal to the length "b" of the first member flange portion 140, previously described. Second member flange portion 190 may have a width equal to the width "c" and a thickness equal to the thickness "d", FIG. 3, of the first member flange portion 140, previously described.

Second member plate portion 170 may be integrally formed with the second member flange portion 190 and may, for example, be arranged at substantially a right angle with respect to the second member flange portion 190 described above. Plate portion 170 may include first and second contact protrusions 172, 174 as shown, for example, in FIG. 2. The contact protrusions 172, 174 may be spaced a distance "i" as shown in FIG. 2. Second member plate portion 170 may have a height equal to the height "f", FIG. 3, of the first member plate portion 120, previously described. Second member plate portion 170 may have a thickness equal to the thickness "g" of the first member plate portion 120, previously described.

Referring again to FIGS. 2 and 3, the first and second members 110, 160 of the compensation mechanism 100 may be formed of materials having different coefficients of thermal expansion. Specifically, first member 110 may, for example be formed of a material having a lower coefficient of thermal expansion relative to the material from which the second member 160 is formed. First member 110 may, for example, be formed of steel having a coefficient of thermal expansion of about $11.3 \times 10^{-6}$ meter/meter degree Celsius. Second member 160 may, for example, be formed of aluminum having a coefficient of thermal expansion of about $24.3 \times 10^{-6}$ meter/meter degree Celsius.

Figure 4:
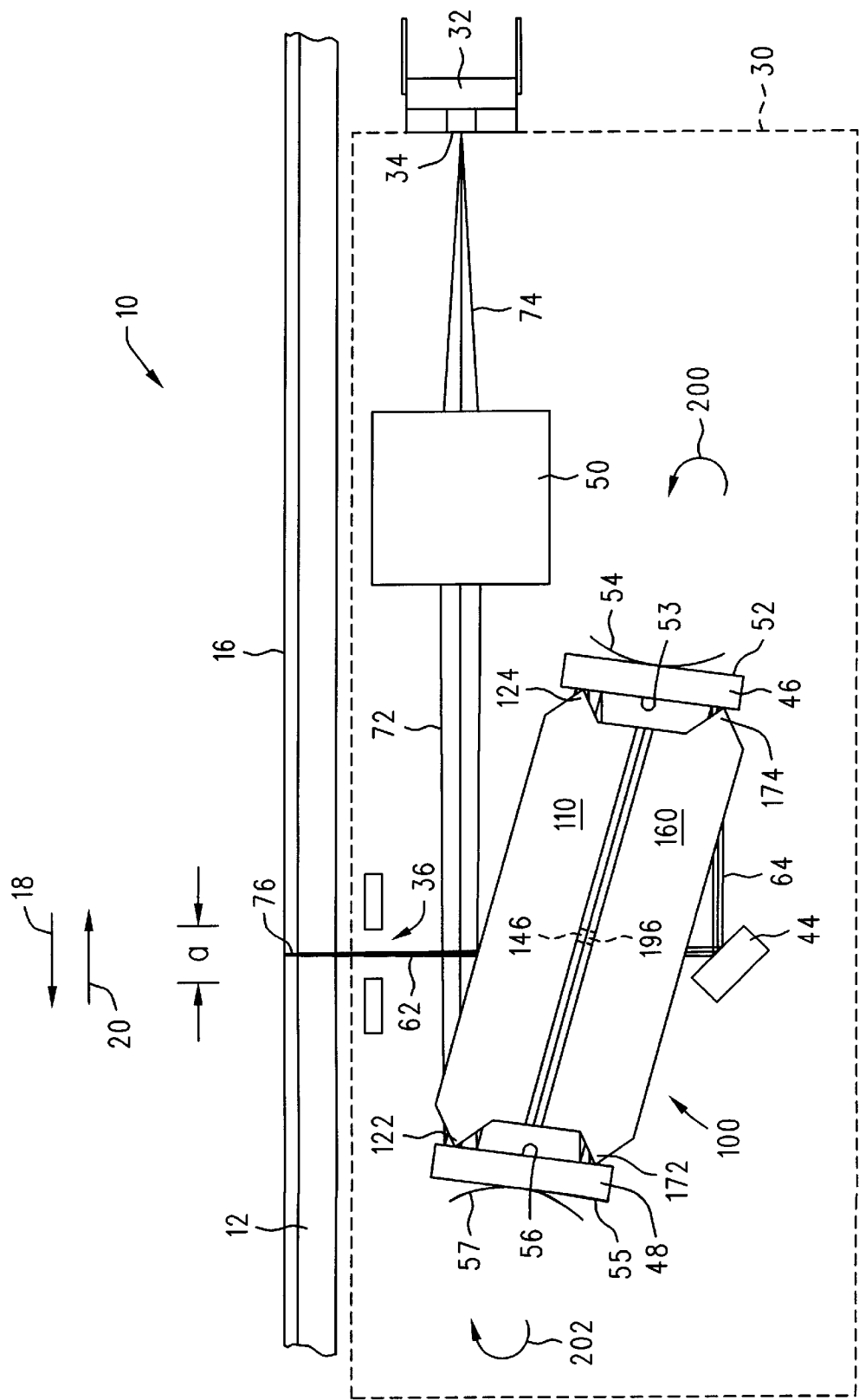
FIG. 4 is a cross-sectional view schematically illustrating the scan line drift compensation mechanism of FIG. 2 installed within the photoelectric imaging apparatus of FIG. 1.

FIG. 4 schematically illustrates the scan line drift compensation mechanism 100 installed within the photoelectric imaging apparatus 10 of FIG. 1. Referring to FIG. 4, the scan line drift compensation mechanism may be installed between the mirrors 46 and 48. When installed in this manner, the compensation mechanism first member contact protrusion 122 will contact an upper portion of the front surface 56 of the mirror 48 and the compensation mechanism first member contact protrusion 124 will contact an upper portion of the front surface 53 of the mirror 46. In a similar manner, the compensation mechanism second member contact protrusion 172 will contact a lower portion of the front surface 56 of the mirror 48 and the compensation mechanism first member contact protrusion 174 will contact a lower portion of the front surface 53 of the mirror 46.

With the scan line drift compensation mechanism 100 installed, as described above, the front surface 53 of the mirror 46 and the front surface 56 of the mirror 48 will index against the contact protrusions 124, 174 and 122, 172, respectively, rather than the first and third housing portions previously described.

The scan line drift compensation mechanism 100 may be mounted to the scan carriage 30 via the holes 146, 196 in a manner as will be described in further detail herein. When mounted in this manner, the scan line drift compensation mechanism will operated to compensate for temperature induced scan line drift in a manner as will now be described in detail.

As previously described with respect to FIG. 1, an increase in temperature may, for example, cause the scan line 76 to drift in the direction 18 away from the centered condition illustrated in FIGS. 1 and 4. This temperature induced drift is caused by thermal expansion within the scan carriage 30 which, in turn, causes relative movement between the components of the optical assembly 40. Referring again to FIG. 4, however, such an increase in temperature will also cause the scan line drift compensation mechanism second member 160 to expand to a greater extent than will the first member 110. This is because, as previously described, the scan line drift compensation first member 110 may be formed from a material having a relatively lower coefficient of thermal expansion than the second member 160.

It is noted that the lengths "e" and "i" of the scan line drift compensation mechanism first and second members 110, 160, respectively, as described previously, may be chosen to be equal at a nominal temperature, e.g., 22 degrees, Celsius, such that the mirrors 46, 48 will be substantially parallel at the nominal temperature. Since, however, the first and second members are formed from materials having differing coefficients of thermal expansion, changes in temperature from the nominal temperature described above will result in the lengths "e" and "i" becoming different and the mirrors 46, 48, thus, assuming a non-parallel configuration. Thus, although the length "e" of the first member 110, FIG. 2, and the length "h" of the second member 160 may be chosen to be equal at a nominal temperature, an increase in temperature above the nominal temperature will result in the length "i" becoming longer than the length "e".

Referring again to FIG. 4, as can be appreciated, the greater lengthening of the member 160 relative to the member 110 upon an increase in temperature will result in a generally counter-clockwise rotation 200 of the mirror 46 and a generally clockwise rotation 202 of mirror 48 as shown. This rotation of the mirrors 46 and 48, in turn, will cause the scan line 76 to tend to move in the direction 20, thus compensating for the scan line drift induced in the opposite direction 18, as previously described.

As also previously described with respect to FIG. 1, a decrease in temperature may, for example, cause the scan line 76 to drift in the direction 20 away from the centered condition illustrated in FIGS. 1 and 4. This temperature induced drift is caused by thermal contraction within the scan carriage 30 which, in turn, causes relative movement between the components of the optical assembly 40. Referring again to FIG. 4, however, such a decrease in temperature will also cause the scan line drift compensation mechanism second member 160 to contract to a greater extent than will the first member 110. This is because, as previously described, the scan line drift compensation first member 110 may be formed from a material having a relatively lower coefficient of thermal expansion than the second member 160.

Referring again to FIG. 4, as can be appreciated, the greater contraction of the member 160 relative to the member 110 upon a decrease in temperature will result in a generally clockwise rotation of the mirror 46 (i.e., in a direction opposite the arrow 200) and a generally counter-clockwise rotation of mirror 48 (i.e., in a direction opposite the arrow 202), as viewed in FIG. 4. This rotation of the mirrors 46 and 48, in turn, will cause the scan line 76 to tend to move in the direction 18, thus compensating for the scan line drift induced in the opposite direction 20, as previously described.

It is noted that, in response to a change in temperature, the scan line drift compensation mechanism 100 will also cause the distance between the mirrors 46, 48 to change. Specifically, the distance between the mirrors 46 and 48 will increase with an increase in temperature and will decrease with a decrease in temperature. This change in distance between the mirrors 46 and 48 also impacts the location of the scan line 76, although to a much lesser extent than the rotation described above.

The amount of compensation provided by the scan line drift compensation mechanism over a given temperature range is dictated by several factors. One such factor is the difference in the coefficients of thermal expansion between the members 110, 160. Although, for exemplary purposes, the members 110, 160 have been described as being steel and aluminum, respectively, having specified coefficients of thermal expansion, the members 110, 160 could, alternatively, be formed from different materials having differing coefficients of thermal expansion. The greater the difference in coefficient of thermal expansion between the two members, the greater will be the compensating effect induced by a given change in temperature.

Another factor influencing the amount of compensating effect is the distance "h", FIG. 2, between the contact protrusions 122, 172 and between the contact protrusions 124, 174. The shorter the distance "h", the greater will be the compensating effect induced by a given change in temperature.

Another factor influencing the amount of compensating effect is the nominal distance "e", "i", FIG. 2, between the first member protrusions 122, 124 and the second member protrusions 172, 174, respectively. Since thermal elongation is proportional to the initial length of the member, the longer the nominal distance "e", "i", the greater will be the compensating effect induced by a given change in temperature.

Another factor influencing the amount of compensating effect relates to the design of the specific scan carriage, e.g., the length and number of the various optical paths segments 62, 64, 66, 68, 70, 72 and 74, FIG. 1, and the specific arrangement and configuration of the optical assembly 40.

It is noted that the scan line drift compensation mechanism first member 110 has been described as being formed from a material having a lower coefficient than the scan line drift compensation mechanism second member 160 for illustration purposes only. If a particular scan carriage produced opposite scan line drift (i.e., in the direction 120) with an increase in temperature, then it would be desirable to reverse this arrangement, i.e., by forming the scan line drift compensation mechanism first member 110 from a material having a higher coefficient than that of the scan line drift compensation mechanism second member 160.

As can be appreciated from the above, the scan line drift compensation mechanism 100 may be selectively configured to compensate for a desired amount of temperature induced scan line drift. An exemplary method of determining this configuration will now be described in detail.

As a first step, the amount and direction of temperature induced scan line drift must be determined for the scan carriage in question. To make this determination, the scan carriage, without the drift compensation mechanism installed, (in other words, configured as generally shown in and described with respect to FIG. 1) may be placed within a temperature chamber. The temperature of the chamber may be set to the specified nominal temperature for the scan carriage, e.g., 22 degrees, Celsius. The location of the scan line corresponding to this nominal temperature may then be noted.

The chamber may then be cooled to the minimum temperature within the specified operating range for the scan carriage, e.g., 5 degrees, Celsius. The location of the scan line corresponding to this minimum temperature may then be noted.

The chamber may then be heated to the maximum temperature within the specified operating range for the scan carriage, e.g., 40 degrees, Celsius. The location of the scan line corresponding to this maximum temperature may then be noted.

With the information acquired as described above, the amount and direction of scan line drift may readily be determined across the specified operating range for the scan carriage. Once the amount and direction of scan line drift are determined, the scan line drift compensation mechanism 100 may be designed to counteract this specific temperature induced drift for the tested scan carriage. Since scan line carriages of the same design tend to exhibit consistent temperature induced scan line drift characteristics, the scan line drift compensation mechanism 100, once designed for a particular scan carriage, may be used on any scan carriage of the same design.

In order to configure the scan line drift compensation mechanism to compensate for a given measured scan line drift, as described above, the scan line drift mechanism factors previously described may be selectively determined (e.g., the difference in coefficients of thermal expansion between the members 110, 160; the distance "h" and the distance "e", "i"). As previously described, these factors influence the amount of rotation 200, 202, FIG. 4, experienced by the mirrors 46, 48. The relationship between this mirror rotation and the amount of scan line correction depends upon the specific configuration of the scan carriage optical assembly 40 (e.g., the distance between the mirrors 44, 46, 48; the distance between the mirror 44 and the document 16 and the number of times that the optical path 60 is reflected by the mirrors 44, 46, 48). Accordingly, the required amount of rotation of the mirrors 46, 48 to achieve a particular scan line drift correction must be separately calculated for each scan carriage optical assembly design.

The amount of temperature induced change in length of the members 110, 160 may be calculated according to the following equation:

$$dl = L \times CTE \times dt$$

where:

"dl" is the change in length;

"L" is the nominal length of the plate portion;

"CTE" is the coefficient of thermal expansion; and

"dt" is the change in temperature (in degrees Celsius)

As an example, using the coefficient of thermal expansion previously set forth for the first member 110 ($11.3 \times 10^{-6}$ meter/meter degree Celsius) and assuming a nominal length "L"="e" (FIG. 2) of 43.1 mm at a nominal temperature of 22 degrees Celsius, a change in temperature from the nominal temperature to an elevated temperature of 40 degrees Celsius will induce an increase in length ("dl") in the first member 110 as follows:

$$dl = 43.1 \times (11.3 \times 10^{-6}) \times (40 - 22)$$

Thus, $$dl = 0.0088 \text{ mm}$$

Similarly, using the coefficient of thermal expansion previously set forth for the second member 160 ($24.3 \times 10^{-6}$ meter/meter degree Celsius) and assuming the same nominal length "L"="i" (FIG. 2) of 43.1 mm at a nominal temperature of 22 degrees Celsius, a change in temperature from the nominal temperature to an elevated temperature of 40 degrees Celsius will induce an increase in length ("dl") in the second member 160 as follows:

$$dl = 43.1 \times (24.3 \times 10^{-6}) \times (40 - 22)$$

Thus, $$dl = 0.0189 \text{ mm}$$

Accordingly, when the members 110, 160 have a nominal length of 43.1 mm and coefficients of thermal expansion as previously set forth, an increase in temperature from the nominal temperature of 22 degrees Celsius to a temperature of 40 degrees Celsius, will cause a difference in elongation ("dE") between the first and second members 110, 160. Specifically, the second member 160 will elongate about 0.0101 mm more (0.0189−0.0088) than will the first member 110.

The total rotation of the mirrors 46, 48 may be calculated as follows:

$$R = \arctan\left(\frac{dE}{h}\right)$$

Where:

"R" is the total rotational angle of the mirrors;

"dE" is the difference in elongation between the members, as calculated above; and "h" is the distance "h", FIG. 2.

Combining the equations set forth above, the total rotational angle may also be expressed as follows:

$$R = \arctan\left(\frac{L}{h} \times dt \times dCTE\right)$$

Where:

"R" is the total rotational angle of the mirrors;

"L" is the nominal length "e", "i", FIG. 2, of the members 110, 160

"h" is the distance "h", FIG. 2;

"dt" is the change in temperature (in degrees Celsius); and

"dCTE" is the difference in the coefficients of thermal expansion between the members 110, 160.

Thus, using the parameters set forth above and a distance "h" of 12.0 mm, the total rotational angle of the mirrors 46, 48 may be calculated as follows:

$$R = \arctan\left(\frac{43.1}{12} \times (40 - 22) \times (24.3 \times 10^{-6} - 11.3 \times 10^{-6})\right)$$

Thus, in the above example, the total rotational angle "R" is about 0.048 degrees.

Figure 5:
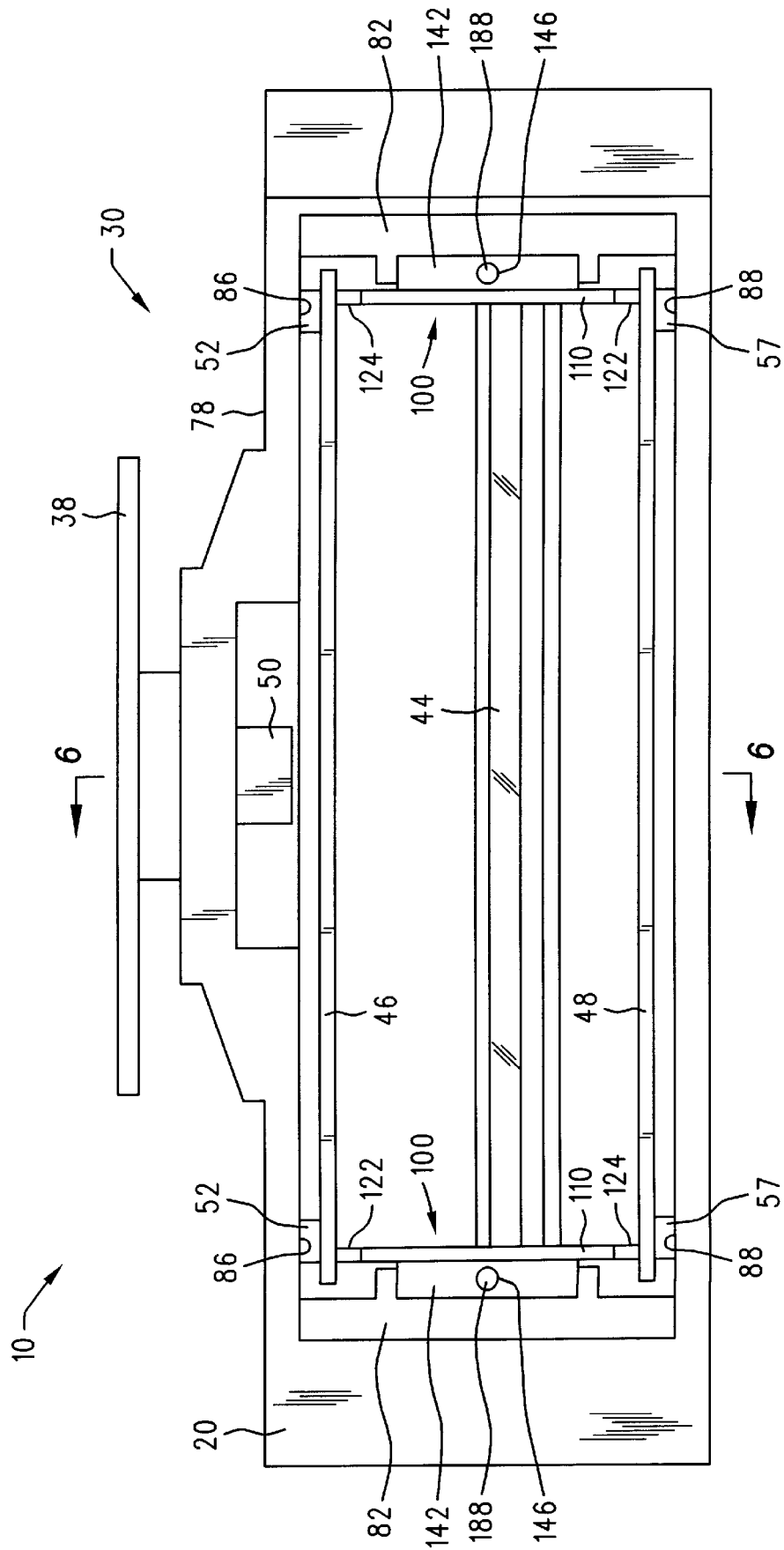
FIG. 5 is a top plan view of a portion of a photoelectric imaging apparatus with the scan line drift compensation mechanism of FIG. 2 installed therein.
Figure 6:
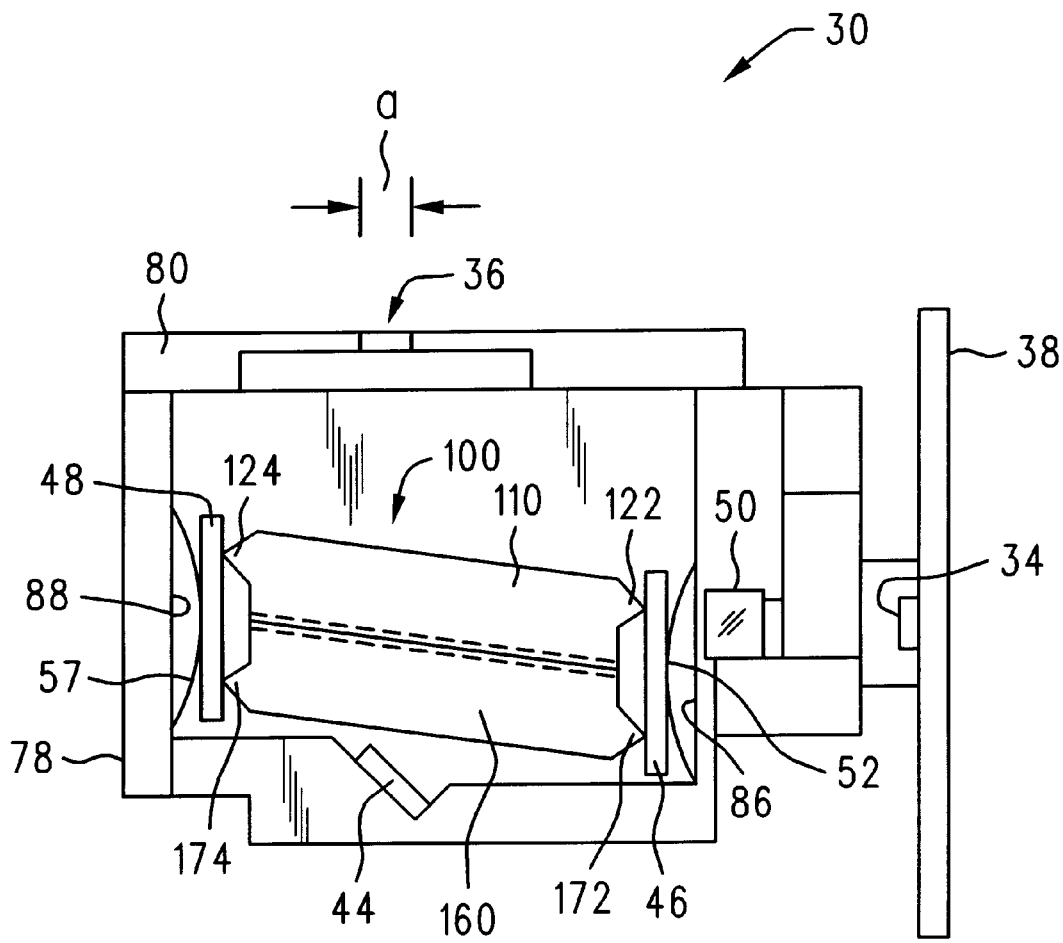
FIG. 6 is cross-sectional view taken along the line 6—6 of FIG. 5.

FIGS. 5 and 6 illustrate an exemplary installation of the scan line drift compensation mechanism 100 within a scan carriage 30. It is noted that, although only one scan line drift compensation mechanism 100 is shown in the schematic illustration of FIG. 4, two scan line drift compensation mechanisms may be used. As illustrated in FIG. 5, the two scan line drift compensation mechanisms 100 may be located at the ends of the mirrors 46 and 48. In this manner, the two scan line drift compensation mechanisms 100 may cooperate to adjust the mirrors 46 and 48 and, thus, compensate for temperature induced scan line drift.

Referring to FIG. 6, the scan carriage 30 may include a body portion 78 and a cover member 80. Body portion 78 may house the mirrors 44, 46 and 48, the lens 50 and the photosensor package 32, which may be mounted on a printed circuit board 38 in a conventional manner. Cover portion 80 may close top of the body portion 78 and may include the slot 36 previously described.

For illustration purposes, FIG. 5 depicts the scan carriage 30 with its cover portion 80 removed. Referring to FIG. 5, scan carriage body portion 78 may include a pair of shelves 82 which may be integrally formed with the remainder of the scan carriage body portion 78. Each scan line drift compensation mechanism 100 may be secured to the scan carriage body portion 78 via a connection member 188 which may extend through the holes 146, 196 of the compensation mechanism 100, FIGS. 2–4, and into the scan carriage body portion shelf 82. The connection members 188 may, for example, be bolts or screws which may be threadedly engaged within the shelves 82. Alternatively, the connection members 188 may be any conventional connection mechanism.

Figure 7:
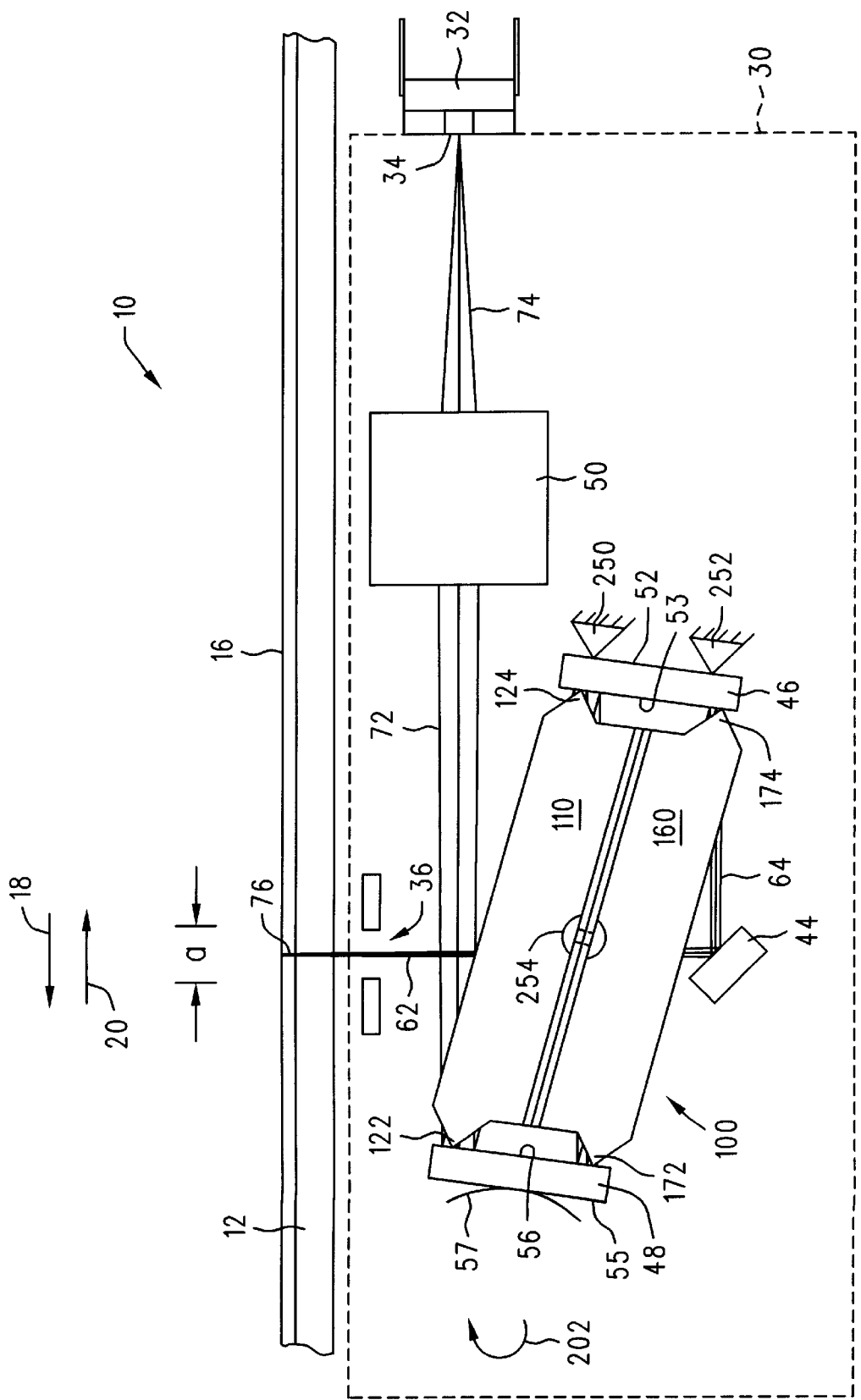
FIG. 7 is a cross-sectional view schematically illustrating an alternative embodiment of the scan line drift compensation mechanism installed within the photoelectric imaging apparatus of FIG. 1.
Figure 8:
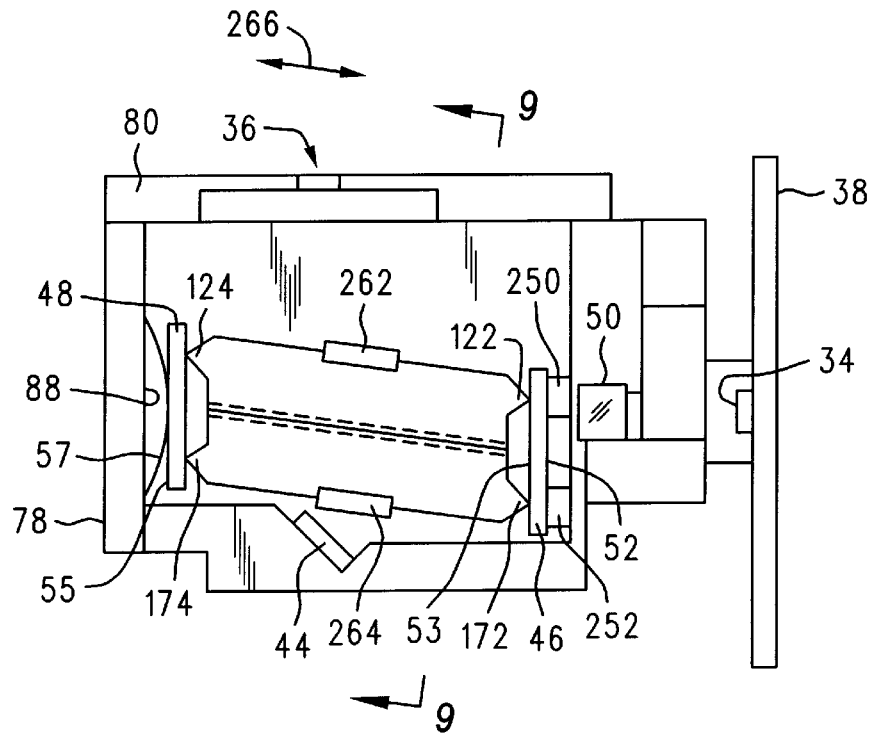
FIG. 8 is a cross-sectional view similar to FIG. 6 but illustrating the installation of the alternative scan line drift compensation mechanism of FIG. 7.
Figure 9:
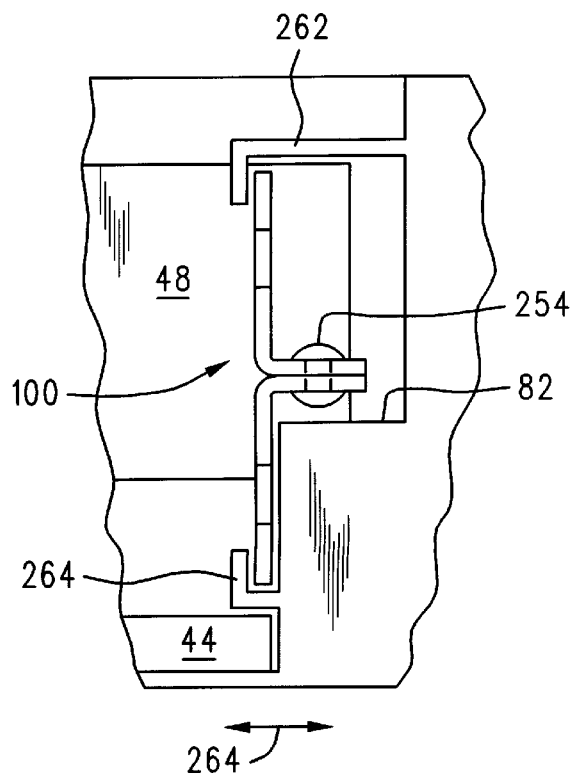
FIG. 9 is a cross-sectional view taken along the line 9—9 of FIG. 8.

FIGS. 7–9 schematically illustrate an alternative embodiment in which one of the mirrors, e.g., the mirror 46 as illustrated in FIG. 7, has its rear surface 52 solidly mounted to the scan carriage body portion 78. This solid mounting is schematically illustrated by the mounting blocks 250, 252 in FIGS. 7 and 8. The other mirror, e.g., the mirror 48 may be mounted in a manner identical to that described previously with respect to FIG. 2, i.e., with a spring 57 located between the rear surface 55 of the mirror 48 and the scan carriage portion 88.

Since the rear surface 52 of the mirror 46 is solidly indexed against the scan carriage 30 and since the scan line drift compensation mechanism 100 is solidly indexed against the front surface 53 of the mirror 46 (via the protrusions 124, 174), all of the adjustment provided by the scan line drift compensation mechanism 100, in the embodiment of FIGS. 7–9, will take place in the mirror 48. Since the right half (as viewed in FIG. 7) of the scan line drift compensation mechanism 100 is constrained from movement, the mirror 48 will generally rotate twice as much as it would in the dual spring mounted mirror embodiment illustrated in FIG. 1. Accordingly, although only one of the mirrors is permitted to rotate in the embodiment of FIGS. 7–9, the same amount of adjustment may be accomplished.

It is noted that, although FIGS. 7–9 illustrate the mirror 46 as being solidly mounted and the mirror 48 being spring mounted, this configuration could easily be reversed with the same result achieved. It is further noted that the scan line drift compensation mechanism 100 depicted in FIGS. 7–9 is not rigidly mounted to the scan carriage 30 as in the embodiment illustrated in FIGS. 2, 5 and 6. Instead, the scan line drift compensation mechanism 100 of FIGS. 7–9 is allowed to freely float between the mirrors 46 and 48. This floating is necessary in the embodiment of FIGS. 7–9 since the right side of the scan line drift compensation mechanism 100 (i.e., the protrusions 124, 174) is constrained from movement.

Since the scan line drift compensation mechanism is not mounted to the scan carriage, a connection mechanism 254 may be used to secure the first and second members 110, 160 together for stability as illustrated in FIGS. 7 and 9. The connection member 254 may extend through the holes 146, 196, FIG. 2, in the scan line drift compensation mechanism first and second members 110, 160. The connection member may, for example, be a rivet, as illustrated in FIGS. 7 and 9, or may be any other type of connection member capable of effectively securing the scan line drift compensation mechanism first and second members 110, 160 to one another.

It is further noted, with respect to the embodiment of FIGS. 7–9, that a pair of brackets 262, 264, FIGS. 8 and 9, may also be provided on the scan carriage 30 to hold the scan line drift compensation mechanism 100 in place relative to the scan carriage 30. Such brackets may be configured so as to substantially prevent lateral movement of the scan line drift compensation mechanism 100, i.e., movement in the directions indicated by the arrow 264 in FIG. 9, while still freely permitting thermal elongation and contraction of the scan line drift compensation mechanism 100 in the directions indicated by the arrow 266 in FIG. 8. The brackets 262, 264 may, for example, be integrally molded with the scan carriage 30.

As an alternative to indexing the fixed side of the scan line drift compensation mechanism 100 to a rigidly mounted mirror, as described above, the fixed side may instead be indexed directly to a portion of the scan carriage 30. In this embodiment, the fixed side may be rigidly mounted to the housing, e.g., via a connection member such as the connection member 188 illustrated in FIG. 5. Alternatively, the fixed side may merely be indexed against a portion of the scan carriage 30. In this alternative, the scan line drift compensation mechanism 100 may be secured against lateral movement using brackets, such as the brackets 262, 264 described previously with respect to FIGS. 8 and 9.

It is noted that the amount of scan line compensation provided by the scan line drift compensation mechanism 100 will vary, depending upon the particular alternative embodiment employed, as described above. This variance is primarily due to the fact that rotating a mirror located relatively further, optically, from the document 16 (e.g., the mirror 48, FIG. 1) will have a greater impact on the location of the scan line 76 than will rotating a mirror located relatively closer, optically, to the document 16 (e.g., the mirror 46).

As previously described, in the embodiment of FIG. 4, both of the mirrors 46 and 48 rotate. In the embodiment of FIG. 7, however, only the mirror 48 (which is optically further from the document 16 than the mirror 46) is permitted to rotate. In the embodiment of FIG. 7, thus, the mirror 48 experiences all of the rotation induced by the scan line drift compensation mechanism 100. The embodiment of FIG. 7 will, therefore, induce greater movement of the scan line 76 than will the embodiment of FIG. 4, with all other parameters being equal.

It is further noted that the further embodiment (described, but not illustrated) in which only the mirror 46 is permitted to rotate, would induce relatively less movement of the scan line than the embodiments of FIGS. 4 and 7 as discussed above. This is because the mirror 46 is relatively closer, optically, to the document 16.

The scan line drift compensation mechanism has been described above with respect to a double bounce optical assembly, i.e., one in which the optical path 60 reflects off of each of the mirrors 46, 48 twice, as previously described with respect to FIG. 1. In such a double bounce system, the scan line adjustment provided by the scan line drift compensation mechanism is magnified since moving either of the mirrors 46, 48 will affect two optical paths. It is noted, however, that the scan line drift compensation mechanism 100 described herein could readily be used in conjunction with a single bounce optical assembly or with any other type of optical assembly.

It is further noted that, although the scan line drift compensation mechanism has been described herein, for exemplary purposes, in conjunction with a particular scan carriage configuration, it could readily be used in conjunction with any type of scan carriage. The scan line drift compensation mechanism 100 could further readily be used in conjunction with any photoelectric imaging device using a line focus system. The scan line drift compensation mechanism could, for example, be used in a stationary optical assembly, in which the object being imaged is moved relative to the optical assembly, or in a hand-held scanning device.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A photoelectric imaging apparatus for producing machine-readable data representative of an imaged object, comprising:
   (a) a photosensor assembly;
   (b) a light path extending between said object and said photosensor assembly;
   (c) an optical component located along said light path;
   (d) an optical component displacement device in contact with said optical component, wherein said optical component displacement device includes:
      a first member having a first coefficient of thermal expansion;
      a second member having a second coefficient of thermal expansion; and
      wherein said first coefficient of thermal expansion is different from said second coefficient of thermal expansion.

2. The photoelectric imaging apparatus of claim 1 wherein said optical component comprises a mirror.

3. The photoelectric imaging apparatus of claim 1 and further comprising a second optical component located along said light path.

4. The photoelectric imaging apparatus of claim 3 wherein said optical component displacement device is in contact with said second optical component.

5. The photoelectric imaging apparatus of claim 1 and further comprising:
   a housing containing said photosensor assembly, said optical component and said optical component displacement device.

6. The photoelectric imaging apparatus of claim 5 wherein said optical component displacement device is attached to said housing.

7. The photoelectric imaging apparatus of claim 5 and further comprising a resilient member located between said optical component and said housing.

8. The photoelectric imaging apparatus of claim 1 wherein both said first member and said second member are in contact with said optical component.

9. A photoelectric imaging apparatus for producing machine-readable data representative of an imaged object, comprising:
   a photosensor assembly;
   an optical component located along a light path extending between said object and said photosensor assembly;
   wherein said optical component includes a first surface and an oppositely disposed second surface;
   a first member having a first coefficient of thermal expansion, wherein said first member is in contact with said first surface of said optical component;
   a second member having a second coefficient of thermal expansion, wherein said second member is in contact with said first surface of said optical component; and
   wherein said first coefficient of thermal expansion is different from said second coefficient of thermal expansion.

10. The photoelectric imaging apparatus of claim 9 wherein said first surface is located within said light path.

11. The photoelectric imaging apparatus of claim 9 wherein said optical component comprises a mirror.

12. The photoelectric imaging apparatus of claim 9 and further comprising a second optical component located along said light path.

13. The photoelectric imaging apparatus of claim 12 wherein said first and second members are in contact with said second optical component.

14. The photoelectric imaging apparatus of claim 9 and further comprising:
   a housing containing said photosensor assembly, said optical component and said first and second members.

15. The photoelectric imaging apparatus of claim 14 wherein said first and second members are attached to said housing.

16. The photoelectric imaging apparatus of claim 14 and further comprising a resilient member located between said housing and said second surface.

17. A method for improving the alignment of a beam of light within a photoelectric imaging apparatus, said method comprising the steps of:
   providing a photosensor array within said photoelectric imaging apparatus;
   providing an imaging subassembly within said photoelectric imaging apparatus;
   providing an optical component within said imaging subassembly;
   providing an optical component displacement device in contact with said optical component;
   directing said beam of light with said imaging subassembly from a portion of an object to be imaged by said photoelectric imaging apparatus to said photosensor array; and
   improving the alignment of said beam of light with said photosensor array by applying force to said optical component with said optical component displacement device in response to a change in temperature.

18. The method of claim 17 wherein said optical component comprises a mirror.

19. The method of claim 18 wherein said improving the alignment of said beam of light comprises rotating said mirror.

20. The method of claim 17 and further including providing a second optical component within said imaging subassembly.

21. The method claim 20 wherein said improving the alignment of said beam of light comprises applying force to said second optical component with said optical component displacement device in response to a change in temperature.

* * * * *

UNITED STATES PATENT AND TRADEMARK OFFICE
CERTIFICATE OF CORRECTION

PATENT NO.    : 6,147,343                             Page 1 of 1
DATED         : November 14, 2000
INVENTOR(S)   : Michael L. Christensen It is certified that error appears in the above-identified patent and that said Letters Patent is hereby corrected as shown below:

<u>Column 16,</u>
Line 28, after "comprising" delete "the steps of"

Signed and Sealed this

Twelfth Day of November, 2002

Attest:

Attesting Officer

JAMES E. ROGAN
Director of the United States Patent and Trademark Office